(No Model.)

G. W. FREEMAN.
FASTENING FOR LEATHER.

No. 257,818. Patented May 9, 1882.

WITNESSES
Villette Anderson.
Philip L. Masi

INVENTOR
Geo. W. Freeman,
by Anderson & Smith
his ATTORNEYS

N. PETERS, Photo-Lithographer, Washington, D. C.

UNITED STATES PATENT OFFICE.

GEORGE W. FREEMAN, OF FRANKFORT, INDIANA, ASSIGNOR OF ONE-HALF TO THEODORE F. ALBEE, OF SAME PLACE.

FASTENING FOR LEATHER.

SPECIFICATION forming part of Letters Patent No. 257,818, dated May 9, 1882.

Application filed February 21, 1882. (No model.)

*To all whom it may concern:*

Be it known that I, GEO. W. FREEMAN, a citizen of the United States, resident of Frankfort, in the county of Clinton and State of Indiana, have invented a new and valuable Improvement in Fastenings for Leather, &c.; and I do hereby declare that the following is a full, clear, and exact description of the construction and operation of the same, reference being had to the annexed drawings, making a part of this specification, and to the letters and figures of reference marked thereon.

Figure 1:
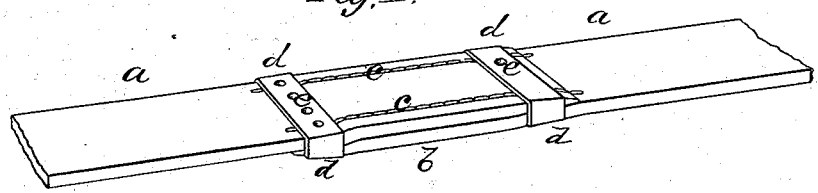
Figure 2:
Figure 3:
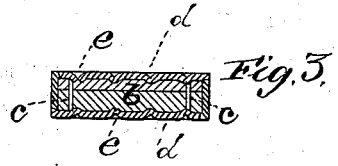

Figure 1 of the drawings is a representation of a perspective view of my leather-fastening. Fig. 2 is a sectional view of the same, and Fig. 3 is a cross-sectional view.

This invention has relation to fastenings for leather; and it consists in the novel construction and arrangement of parts, as will be hereinafter fully described, and particularly pointed out in the claim.

In the accompanying drawings, the letters *a a* designate the parts of a line or other harness-strap whereof the ends are fastened together by the splice *b*, the stitching being shown at *c*. In making a splice the extremities are in practice skived very thin, and unless the ends of the splice are protected the stitches soon tear out, and the splice becomes wholly or partially ripped apart. In this invention the splice ends are protected by means of thin metal bands or loops *d d*, which extend transversely around the splice at each end on the beveled or skived portion, and are fastened in place permanently and securely by punching inwardly a series of small perforations, *e*, in the loops, carrying the metal into the leather surfaces underneath. In this manner the ends of the splice are thoroughly protected and ripping is prevented.

Having described this invention, what I claim, and desire to secure by Letters Patent, is—

The herein improved method of uniting two pieces of leather, consisting in first securing the overlapping ends together by a line or lines of stitching and surrounding such overlapping portions by a metallic loop or loops held in place by indentations or inwardly-punched perforations, substantially as set forth.

In testimony that I claim the above I have hereunto subscribed my name in the presence of two witnesses.

GEORGE W. FREEMAN.

Witnesses:
WILLIAM M. SIMS,
ROBERT W. WEAVER.